United States Patent
Griffin

(10) Patent No.: US 6,634,599 B2
(45) Date of Patent: Oct. 21, 2003

(54) RELEASABLE SUSPENSION FOR AN AIRBORNE STORE

(75) Inventor: Dennis Griffin, Shalford (GB)

(73) Assignee: Flight Refuelling Limited, Dorset (GB)

( * ) Notice: Subject to any disclaimer, the term of this patent is extended or adjusted under 35 U.S.C. 154(b) by 0 days.

(21) Appl. No.: 10/035,255

(22) Filed: Jan. 4, 2002

(65) Prior Publication Data

US 2002/0088902 A1 Jul. 11, 2002

(30) Foreign Application Priority Data

Jan. 5, 2001 (GB) .............................................. 0100277

(51) Int. Cl.[7] ................................................. B64D 9/00
(52) U.S. Cl. ..................................... 244/137.4; 89/1.94
(58) Field of Search ........................... 244/137.1, 137.4; 89/1.54, 1.53, 1.58, 1.59; 294/82.26

(56) References Cited

U.S. PATENT DOCUMENTS

| | | | |
|---|---|---|---|
| 2,550,380 A | * 4/1951 | Redford | 244/137.4 |
| 2,852,981 A | * 9/1958 | Caya | 244/137.4 |
| 4,246,472 A | * 1/1981 | Sun et al. | 244/137.4 |
| 4,343,447 A | * 8/1982 | Reed, III | 244/137.4 |
| 4,392,411 A | 7/1983 | Minkler | 89/1.819 |
| 4,416,437 A | 11/1983 | Hasquenoph et al. | 244/137 |
| 4,520,975 A | * 6/1985 | Blackhurst | 244/137.4 |
| 4,620,680 A | 11/1986 | Hasquenoph et al. | 244/137 |
| 4,632,338 A | 12/1986 | Hasquenoph et al. | 244/137 |
| 4,870,885 A | 10/1989 | Grosselin et al. | 89/1.806 |
| 5,172,873 A | * 12/1992 | Lum | 244/137.4 |
| 5,484,243 A | 1/1996 | Yacobovitch | |
| 5,970,842 A | 10/1999 | Knapp et al. | 89/1.54 |

FOREIGN PATENT DOCUMENTS

| | | |
|---|---|---|
| AT | 308 553 | 7/1973 |
| EP | 0 340 399 | 11/1989 |
| EP | 0 379 539 | 3/1993 |
| EP | 0 562 831 | 9/1993 |
| EP | 0 745 531 | 8/1999 |
| EP | 0 759 532 | 11/2000 |
| GB | 2 199 396 | 7/1988 |
| GB | 2 273 146 | 6/1994 |
| GB | 2 309 069 | 7/1997 |
| JP | 6-241694 | 9/1994 |
| WO | WO 93/03321 | 2/1993 |
| WO | WO 99/21760 | 5/1999 |

* cited by examiner

Primary Examiner—Galen L. Barefoot
(74) Attorney, Agent, or Firm—Finnegan, Henderson, Farabow, Garrett, & Dunner, L.L.P.

(57) ABSTRACT

An airborne store suspension and release arrangement includes two slender "Tee" hangers located one on either side of a vertical plane through the center of the store. Each hanger has a narrow strut portion mounted on the store by one end and an enlarged cross section portion at the other end of the narrow strut portion. The enlarged cross section portion of each hanger is clamped by releasable clamps mounted in a store carrying aircraft. The store and the aircraft are formed with surfaces which abut one another when the store is suspended from the aircraft and the enlarged cross section portions of the hangers are clamped by the clamps. The arrangement of the hangers, the clamps and the abutting surfaces establishes a couple in reaction to a rolling moment to which the store is subjected during maneuvering of the aircraft. Only one such a slender 'Tee' hanger is aligned with the geometrical center of the store in an alternative embodiment. Again, the combination of the hanger, its clamp and the abutting surfaces establishes a couple in reaction to such a rolling moment. In another embodiment, each of th enlarged cross section portions of the two slender "Tee" hangers is slidably suspended from a respective overhead rail.

15 Claims, 15 Drawing Sheets

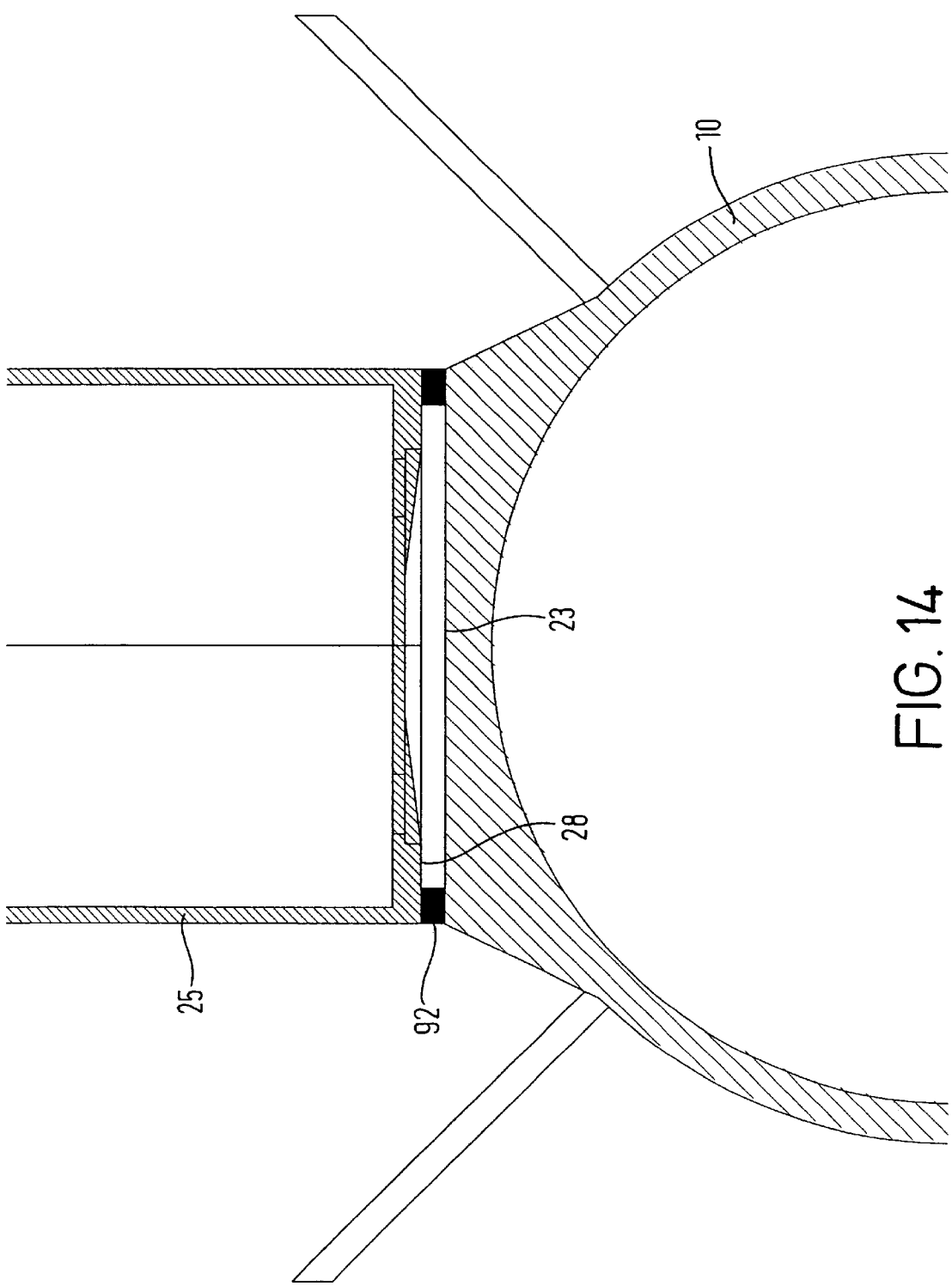

RELEASABLE SUSPENSION FOR AN AIRBORNE STORE

This invention relates to releasable suspension of an airborne store on a carrier aircraft and to a store for releasable suspension on a carrier aircraft.

Conventional airborne store suspension and release equipment will be poorly suited to use on fast military aircraft in the future due to inevitable problems of aerodynamic drag caused by gaps, apertures and excrescences that are unavoidable features of the design of the equipment. Further, the equipment that incorporates rails for launching stores from an aircraft on release is very different from that used for release of suspended free-fall stores from an aircraft and creates significant parasitic drag.

U.S. Pat. No. 4,392,411; WO89/12210; EP-A-0,296,010 and its equivalent U.S. Pat. No. 4,870,885; WO93/03321; EP-A-0,759,532; GB-A-2,309,069 and U.S. Pat. No. 5,970,842 each disclose examples of "Tee" hangers for use in such rail launch equipment. In each case the "Tee" hangers are bulky and present a complex profile to the airstream in flight. U.S. Pat. No. 4,392,411 submits that difficulties arise if the hanger (there are usually three, one behind another along the length of the store) remains on the store after release of the store from the aircraft. These are difficulties which affect the weight of the store, air drag caused by the hanger or parts thereof in the airstream and the space required to accommodate such hangers where they are sunk into structure of the store. Accordingly the hangers are arranged to be separated from the store so that they remain in the embracing means that are mounted in the structure of the store carrying aircraft. This requires a complicated arrangement for mounting each of the hangers on the store and for separating each of those hangers from the store at launch so that they remain in the aircraft structure.

If store suspension and release equipment for a free-fall airborne store should include a U-shaped lug which is secured at the ends of its limbs to the store and which is adapted to be engaged by a hook which is pivotally mounted in the aircraft structure and arranged to pass through the aperture that is formed between the store and the base of the lug between the limbs thereof so as to secure the store to the aircraft and bracing arms are provided which extend over the surface of the store in opposite directions from the lug to which they are joined, the store is able to move excessively relative to the aircraft structure during aircraft manoeuvring due to low structural stiffness of the equipment. EP-A-0,062,581 and its equivalent U.S. Pat. No. 4,416,437; EP-A-0,144,265 and its equivalent U.S. Pat. No. 4,632,338; and JP-A-6241694 disclose examples of such store suspension and release equipment. Even if each bracing arm is provided with a manually adjustable bracing screw which is screwed through it at a location spaced from the lug, each screw being manually adjustable so as to be put in compression with a head portion thereof engaged with the store surface, this arrangement would require considerable preloading of the sway brace arms to ameliorate the inherent lack of stiffness and prevent undesirable store rattle. The load path from the store to the aircraft structure would involve several bending beam elements which would distort excessively under load. EP-A-0,143,713 and its equivalent U.S. Pat. No. 4,620,680 disclose a complicated arrangement in which the hooks may be raised during loading so as to be set under the bracing arms which are initially set at their highest position and which, by operation of a complicated assembly of springs and stops, then automatically positions the bracings arms at different levels depending on the diameter of the store that has been hooked on. EP-A-0,745,531 discloses the provision, in an aircraft which is formed with different housings from which different sizes of store are hung by such a hook suspension, of a device which is fitted into one of the housings that is not used for suspending the store that is hooked on. The device that is so fitted into the one housing has a finger which projects into a hole provided in the store that is hooked on for the purpose of holding the store in place in terms of yaw.

An object of this invention is to enable releasable suspension of an airborne store on a carrier aircraft by means having a significant structural stiffness so that, during aircraft manoeuvring, roll of the store relative to the aircraft structure from which it is suspended is minimal. Another object of the invention is to minimise the effect of parasitic drag on the store due to means provided thereon for the releasable suspension. A further object of the invention is to provide means for fitting to a store for releasable suspension from a carrier aircraft that are suitable for both free-fall stores and rail launched stores.

According to one aspect of this invention there is provided an airborne store suspension and release arrangement including one hanger having a narrow strut portion and an enlarged cross-section portion, the narrow strut portion being adapted to be mounted by one end on a store so as to be upstanding therefrom and the enlarged cross section portion being at another end of the strut portion, the arrangement also including means adapted to be mounted in structure of a store carrying aircraft and operable to embrace said hanger by embracing the enlarged cross section thereof whereby to retain the store suspended from the aircraft and means operable to effect release of the store from the embracing means in order to release the store from the aircraft, wherein means separate from said hanger are provided which are operable in combination with said hanger to establish a couple in reaction to a rolling moment to which said store is subjected during manoeuvring of said store carrying aircraft when said hanger is mounted on said store and said store is suspended from said aircraft structure, the enlarged cross section portion of said hanger being embraced by said releasable embracing means.

The provision of means separate from said one hanger, or, in such an airborne store suspension and release arrangement which includes more than one such a hanger, of means separate from each said hanger which are operable in combination with the respective hanger to establish a couple in reaction to a rolling moment to which said store is subjected during manoeuvring of said store carrying aircraft when the respective hanger is mounted on said store and said store is suspended from said aircraft structure, the enlarged cross section portion of the or each said hanger being embraced by the respective releasable embracing means, enables use of such a hanger which is much more slender than the "Tee" hangers known in the art and which presents a smaller and simpler profile to the airstream than the "Tee" hangers known in the art do.

In one embodiment, said store and said aircraft structure are formed with surfaces which abut one another when said store is suspended from said aircraft structure, said means operable in co-operation with said one hanger to establish said couple including said abutting surfaces. The upstanding portion of said one hanger is aligned with the geometrical center of said store in said one embodiment.

In another embodiment there are two said hangers and respective releasable embracing means operable to embrace the enlarged cross section portion of each hanger, the two hangers being located one on either side of a vertical plane through the center of the store, the vertical plane being substantially midway between the upstanding strut portions of the two hangers. The releasable embracing means may be releasable clamping means operable to clamp said enlarged cross section portion of said one hanger. Alternatively, the embracing means may be overhead rail means from which said store is adapted to be suspended and on which said enlarged cross section portion of each said hanger is adapted to slide.

According to another aspect of this invention there is provided an airborne store fitted with one hanger having a narrow strut portion and an enlarged cross-section portion, the narrow strut portion being mounted by one end on the store so as to be upstanding therefrom and the enlarged cross section portion being at another end of the strut portion remote from the remainder of the store on which it is mounted and being adapted to be embraced by embracing means mounted on a store carrying aircraft whereby to retain the airborne store suspended from the aircraft, and means separate from said one hanger which are adapted to interact with corresponding means provided on the store carrying aircraft when the airborne store is suspended therefrom whereby to establish a couple in reaction to a rolling moment to which said store is subjected during manoeuvring of the store carrying aircraft.

According to further aspect of this invention there is provided an adaptor plate which is adapted to be fitted to an arcuate surface of a store and which has a generally flat surface for engagement with a co-operating flat surface formed on a carrier aircraft, the adapter plate being provided with at least one hanger having a narrow strut portion and an enlarged cross-section portion, the narrow strut portion being mounted by one end on the flat surface of the adapter plate so as to be upstanding therefrom, the enlarged cross section portion being at another end of the strut portion and being adapted to be embraced by embracing means mounted on a store carrying aircraft whereby to retain a store suspended from the aircraft when the adapter plate is fitted to that store.

Several embodiments of this invention will be described now by way of example with reference to the accompanying drawings, of which:

FIG. 14 is a view similar to FIGS. 7A and 7B showing a compressible sealing element between the store and the aircraft structure from which the store is suspended by suspension and release equipment in which this invention is embodied;

FIGS. 1 and 2 show two different forms of airborne store which are to be releasably suspended from a carrier aircraft. Each of these airborne stores has a generally cylindrical body.

Figure 1:
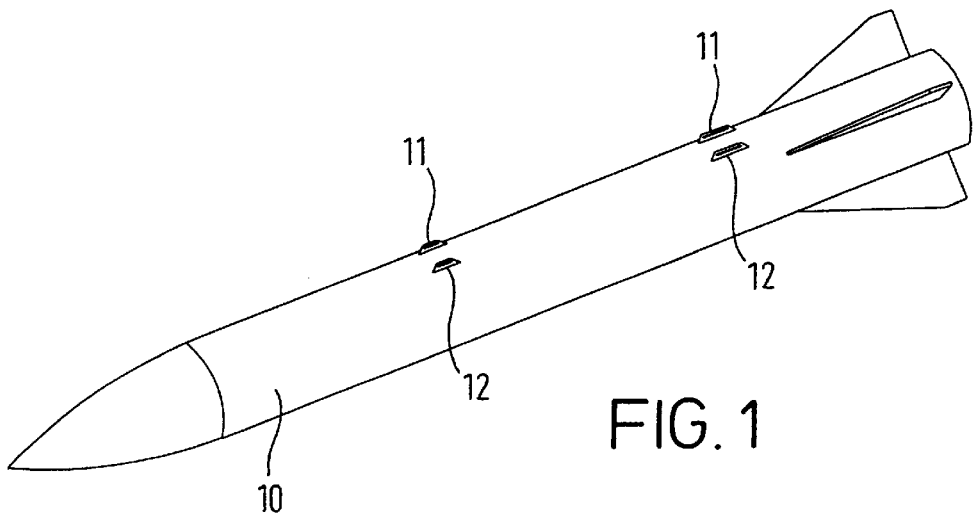
FIG. 1 is a view in elevation of a free-fall store.

FIG. 1 shows an eject launch free-fall airborne store 10 which, in carrying out this invention, is fitted with two pairs of hangers 11 and 12 by which it is to be releasably suspended from a carrier aircraft. The pairs of hangers 11 and 12 are spaced from one another along the axis of the generally cylindrical body.

Figure 2:
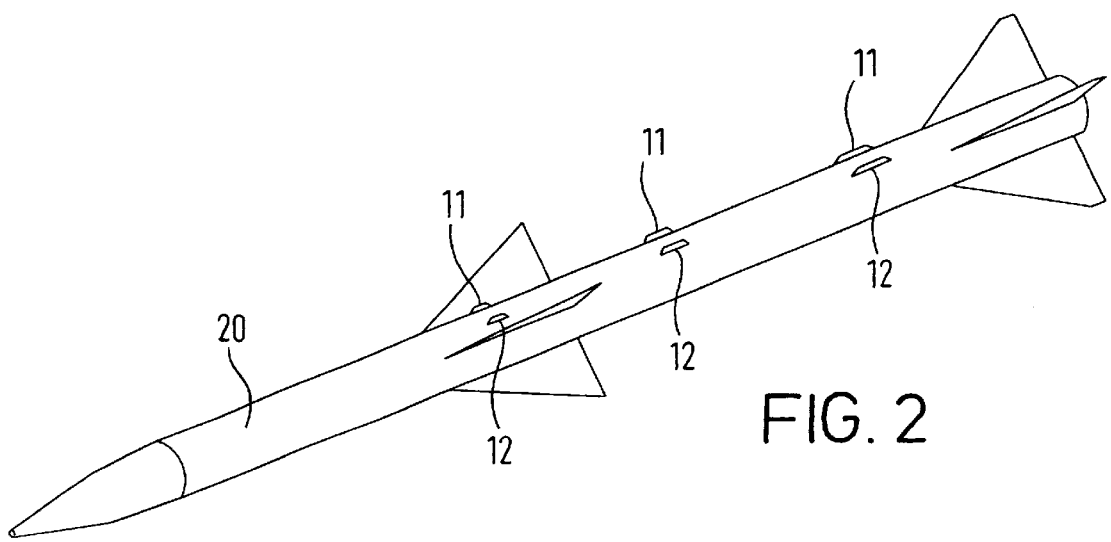
FIG. 2 is a view in elevation of a store which is provided with three pairs of hangers and which is for rail launching from a carrier aircraft.

FIG. 2 shows an airborne store 20 which is designed to be rail launched from a carrier aircraft. In carrying out this invention, the store 20 is fitted with three pairs of hangers 11 and 12, the spacing between the rearmost and the middle of the three pairs of hangers 11 and 12 being greater than that between the middle and the most forward of the pairs of hangers 11 and 12 as is usual with rail launching systems to allow the hangers 11 and 12 to pass during launch over loading slots provided in the rails for loading.

By this invention the hangers 11 and 12 fitted to the two types of airborne store 10 and 20 shown in FIGS. 1 and 2 are similar so that the stores 10 and 20 could be interchangeable so as to be launched by either eject launch for free-fall or by rail launch.

Figure 3:
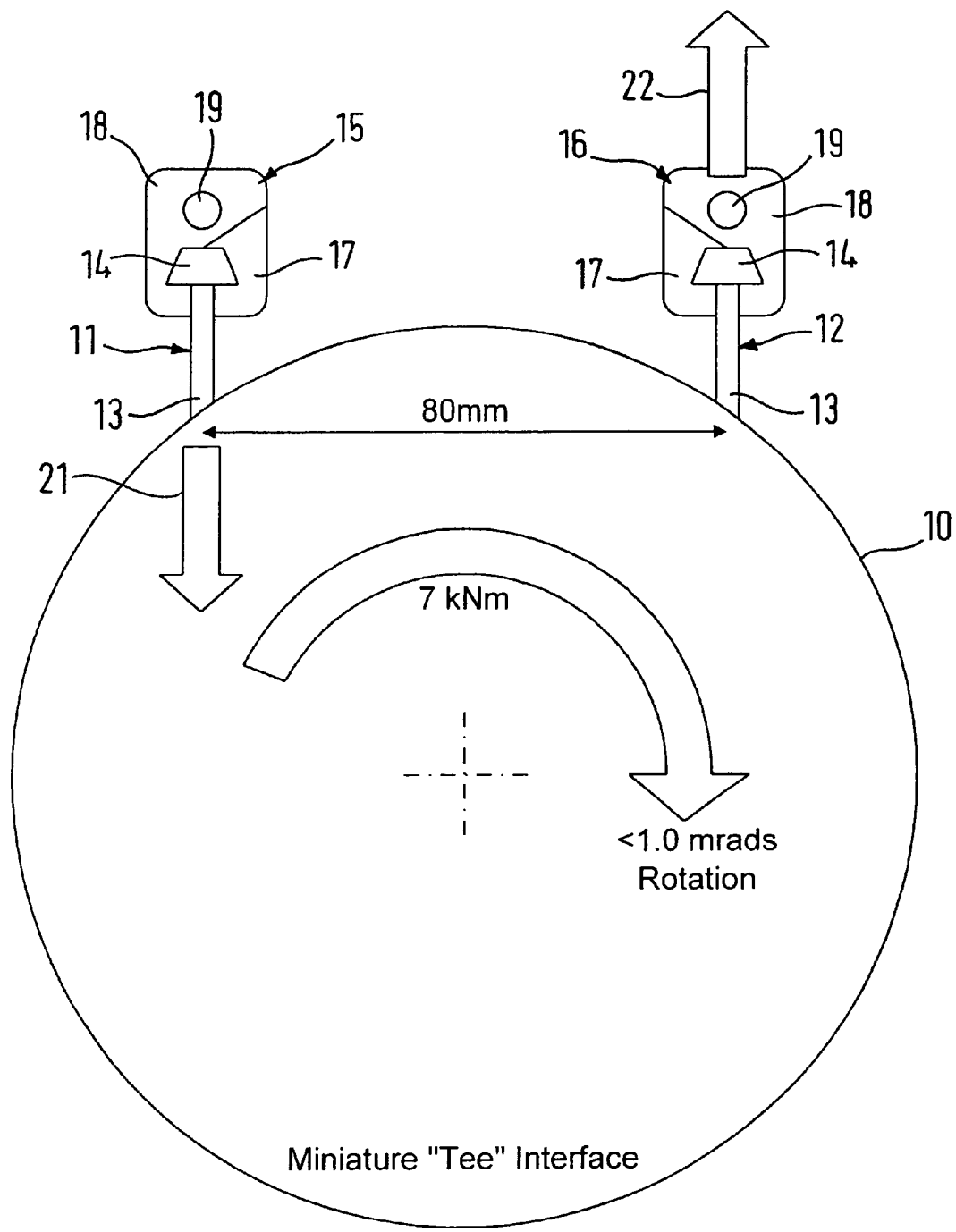
FIG. 3 is a diagrammatic representation of one form of free-fall store suspension and release equipment in which this invention is embodied.

FIG. 3 illustrates the principle of operation of the invention as embodied in suspension and release apparatus for a free-fall eject launch airborne store 10 which is fitted with at least one pair of hangers 11 and 12. Each hanger 11, 12 is T-shaped, having a narrow strut portion 13 and an enlarged head portion 14, the strut portion 13 being mounted by one end on the surface of the store 10 and the enlarged head portion 14 being at the other end of the strut portion 13 so as to form of the arms of the T. Each hanger 11, 12 is symmetrical about a notional plane which is the medial plane of the strut portion 13. Each hanger 11, 12 is mounted on the store 10 so that its strut portion 13 is generally parallel to a notional plane which passes through the center of gravity of the store 10. The notional plane through the center of gravity of the store 10 extends substantially midway between the two hangers 11 and 12.

The head portion 14 of each hanger 11, 12 is embraced by a respective two-part clamping arrangement 15, 16 which is housed within a depending pylon portion (not shown) of structure of the carrier aircraft. Each clamping arrangement 15, 16 has two mutually pivotable parts 17 and 18 which are pivotal about a common pivot 19 which is mounted in the aircraft structure substantially in a notional plane which is coincident with the plane of symmetry of each hanger 11, 12. Hence the loads to which the store 10 is subjected when suspended from a carrier aircraft by a suspension and release apparatus including the two clamping arrangements 15 and 16 are reacted in either tension or compression by the narrow strut portions 13 of the two hangers 11 and 12. In the static condition the two strut portions 13 would be loaded in tension to support the weight of the store 10. In the event of roll forces being applied to the store 10 during manoeuvring of the carrier aircraft, those roll forces would be reacted in tension by the strut portion 13 of one of the hangers 11 and 12 (say the hanger 11 as indicated by the arrow 21 in FIG. 3) and in compression by the strut portion 13 of the other hanger 11, 12 (say the hanger 12 as indicated by the arrow 22 in FIG. 3). The resultant couple would be reacted by the aircraft structure through the pivots 19 of the two clamping arrangements 15 and 16. This arrangement minimises angular movement of the store 10 relative to the aircraft structure from which it is suspended so that it is tolerable. The roll stiffness of this store suspension and release apparatus, is many times greater than can be expected had store suspension and release apparatus included a U-shaped lug and laterally projecting sway brace arms, the lug being for engagement by a hook as described above.

Figure 4:
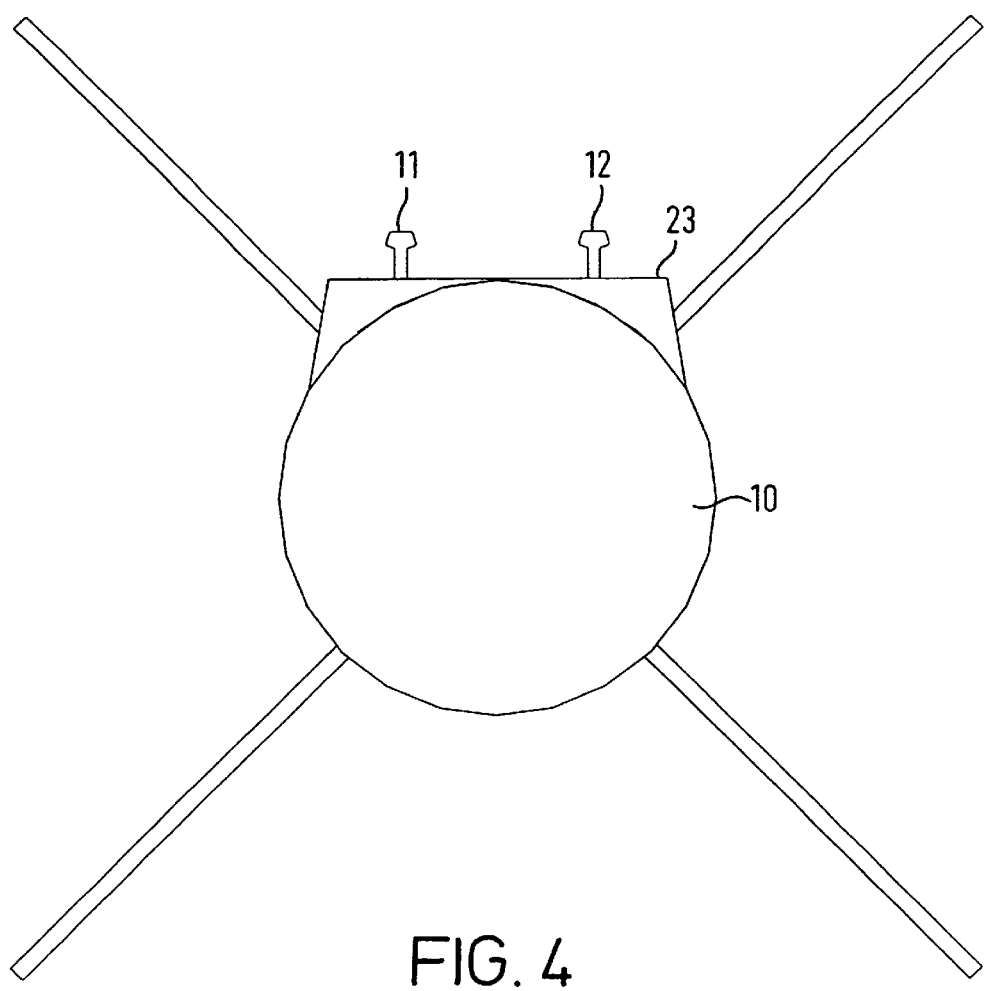
FIG. 4 is an end view of a practical embodiment of a free-fall store for releasable suspension from an aircraft by equipment as illustrated diagrammatically in FIG. 3.

FIG. 4 shows that the T-shaped hangers 11 and 12 are upstanding from a flat portion 23 of the surface of the store 10 which is substantially normal to their narrow strut portions 13. If the flat surface portion 23 can be brought into face to face abutment with a co-operating flat surface formed by the depending pylon portion when the clamping arrangements 15, 16 have been operated to embrace the enlarged head portions 14 of the hangers 11 and 12, that face to face abutment between the flat surface portion 23 and a co-operating flat surface of the pylon portion of the carrier aircraft structure increases the rigidity of the store suspension arrangement.

Figure 5:
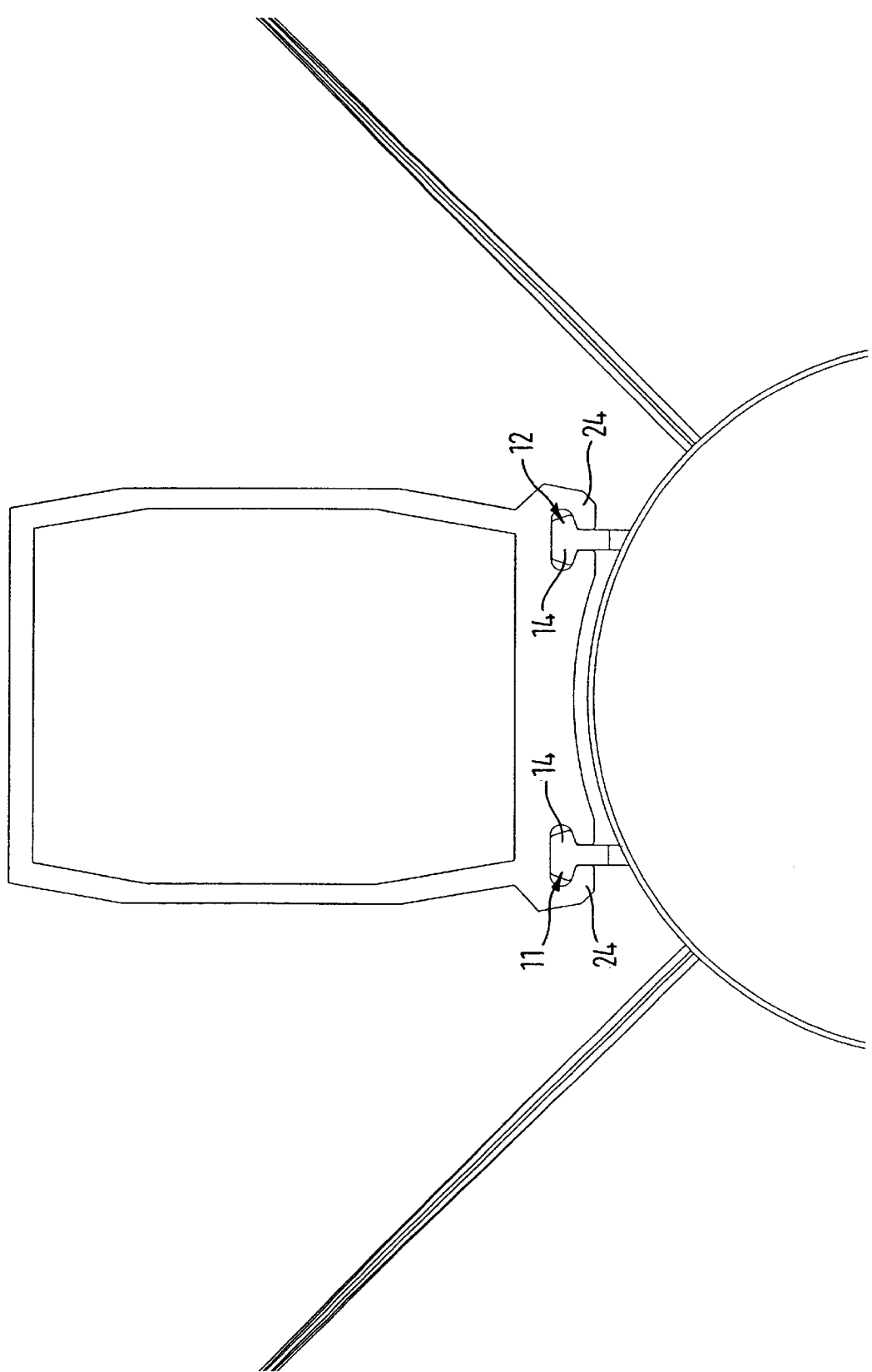
FIG. 5 is a partial cross section of another form of store suspension and release equipment in which this invention is embodied which is operable to launch the store by rail launch.

FIG. 5 shows how a similar pair of hangers 11 and 12 with enlarged head portions 14 can be used as sliders which slide in an overhead rail arrangement 24 which is formed in supporting structure of the carrier aircraft.

Figure 6:
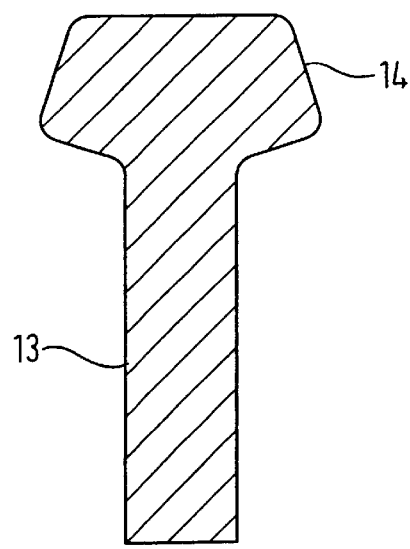
FIG. 6 is an end view showing a preferred cross section of a standard hanger of store suspension and release equipment in which this invention is embodied.

FIG. 6 shows the typical cross section of the preferred form of hanger 11 and 12 as used in either form of airborne store 10, 20 described above with reference to FIGS. 1 to 5. This typical hanger cross section is symmetrical about a notional plane which is the medial plane of its strut portion 13. It has been designed to be embraced by a pair of hook element clamping jaws which are hinged on a single pivot and which thereby serve as the respective two-part clamping arrangement 15, 16 with its common pivot 19 as is shown diagrammatically in FIG. 3. The profile of the hanger 11, 12 is also designed to minimise stress concentrations and bending deflections under load. The strut portion 13 is sized at approximately 5 mm thickness of high strength steel to provide a combination of low frontal cross section and adequate strength and stiffness for hangers 11, 12 that may be somewhere between 40 mm and 100 mm in length. The actual length for any installation will depend upon the load to be carried and/or the respective location on the store. Use of a standard cross section enables interoperability since it will be compatible with a range of stores and ejection release units or launches.

FIG. 6 shows that the undersides of the arms are oblique to the plane of symmetry of the hanger 11, 12, making a large angle therewith and tapering towards the strut portion 13. Also the outer end surfaces of the arms taper towards the plane of symmetry of the hanger 11, 12 away from the strut portion 13.

Figure 7A:
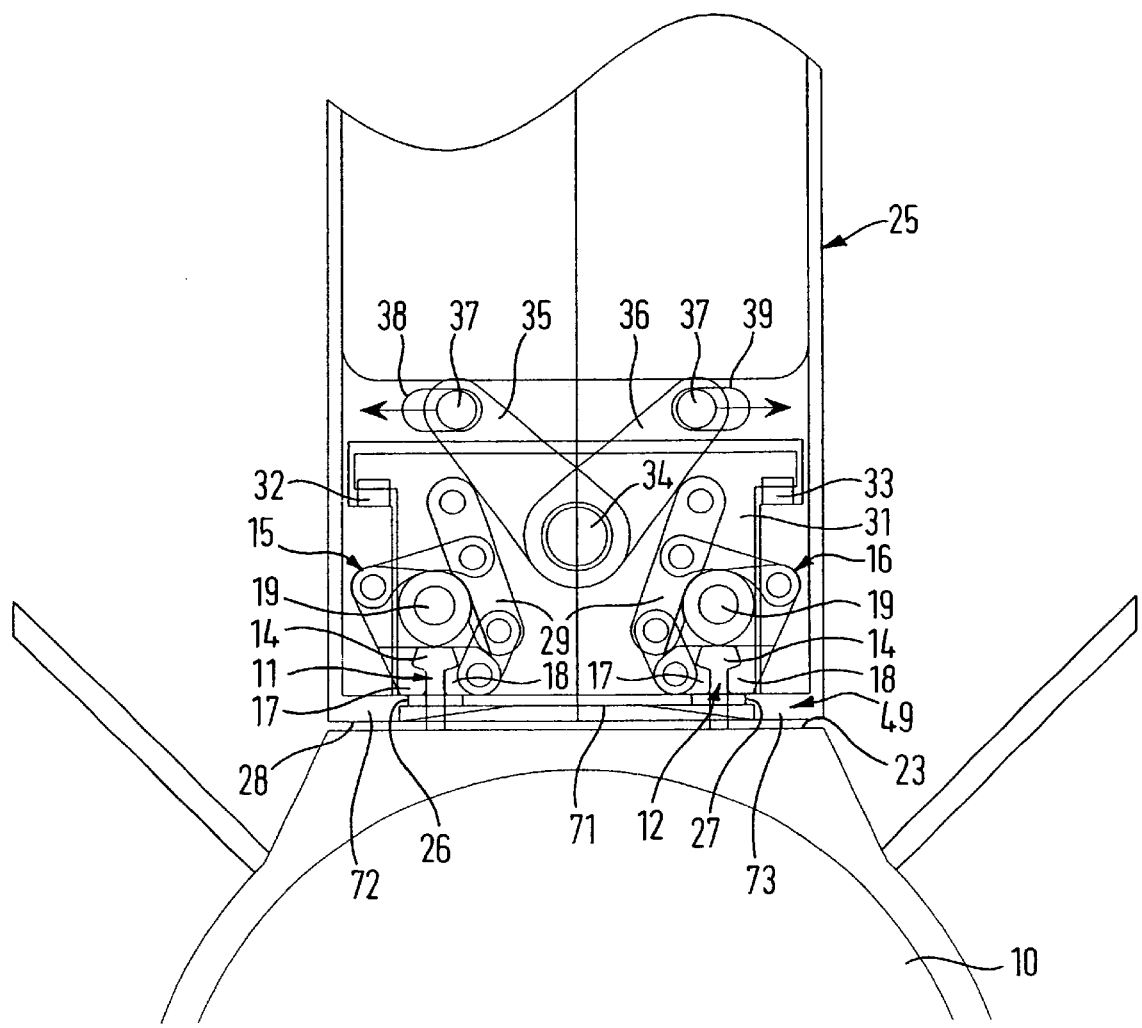
FIG. 7A is a diagrammatic representation of a practical embodiment of the store suspension and release equipment shown diagrammatically in FIG. 3 and a releasable clamping arrangement shown partially engaged with the two hangers.

FIG. 7A shows the part of a store 10, such as is shown in FIG. 4, that includes the pair of hangers 11 and 12 that are upstanding from the flat surface portion 23 of the store 10. Further, it shows the two clamping arrangements 15 and 16 in more detail housed within the interior of the hollow pylon 25. Each clamping arrangement 15, 16 is engaged around the respective hanger 11 and 12 which extends through a respective slot 26, 27 which is formed in a bottom surface 28 of the pylon 25. The width of each slot 26, 27 is just sufficient to allow passage through it of the enlarged head portion 14 of the respective hanger 11, 12.

Figure 7B:
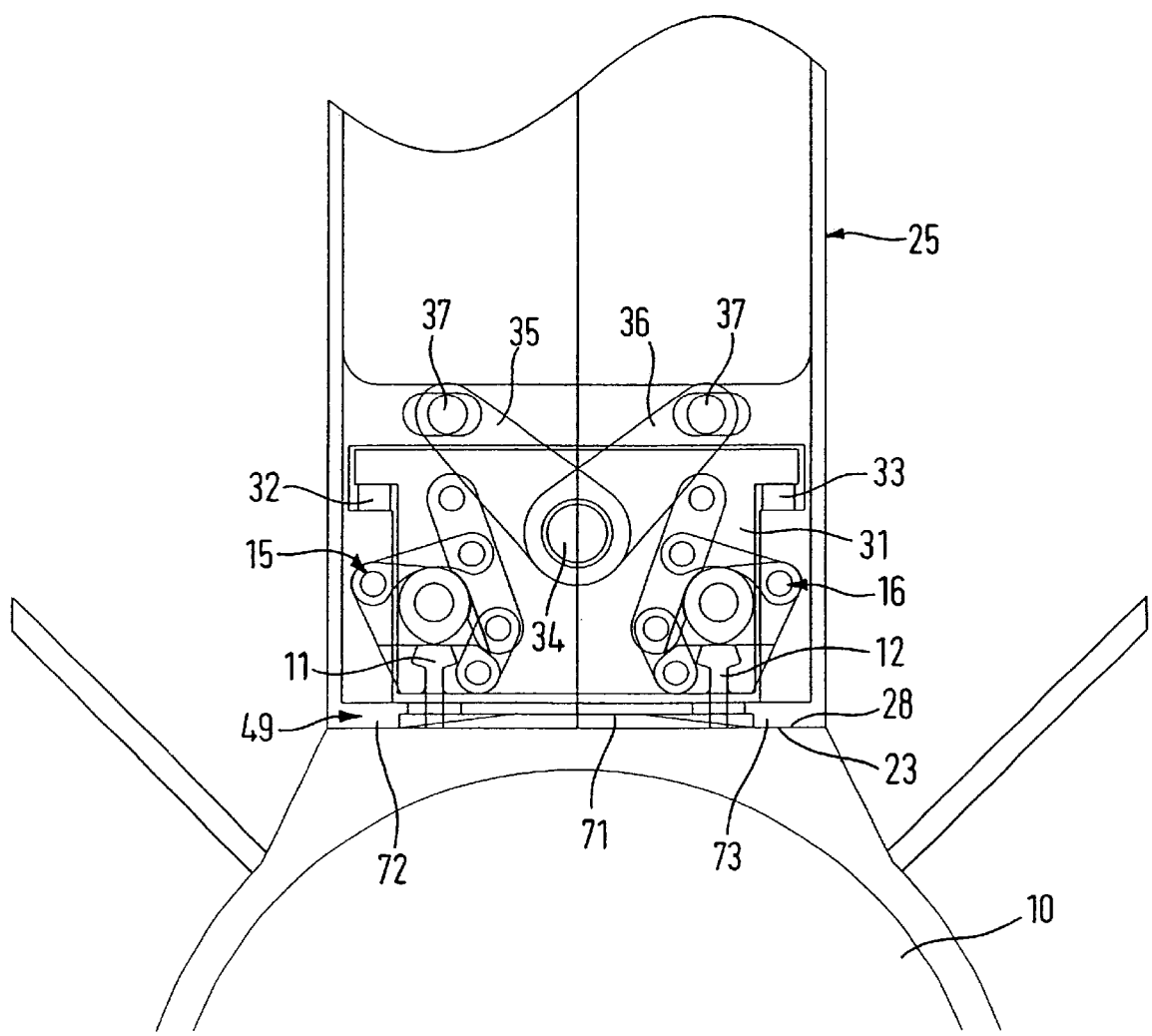
FIG. 7B is a view similar to FIG. 7A showing the releasable clamping arrangement fully engaged.

Each clamping arrangement 15, 16 includes a linkage 29 which is operable to pivot the opposed pair of clamping jaws 17, 18 about the common pivot 19 to bring the clamping jaws 17 and 18 into engagement on either side of the hanger 11, 12 so as to embrace the respective head portion 14, the clamping jaws 17 and 18 being hook-shaped to fit snugly around the tapered side and underneath surfaces of the respective enlarged head portion 14. The two pivots 19 are mounted on a hook support frame 31 which is constrained for vertical movement within the pylon portion 25 of the aircraft structure by vertical guides 32 and 33. A main clevis 34 is mounted substantially centrally on the hook support frame 31. A pair of arms 35 and 36 are journalled on the clevis 34. Each arm 35, 36 carries a roller 37 at its end remote from the clevis 34. Each roller 37 is engaged in a co-operating slot 38, 39. The slots 38 and 39 are formed on either side of the vertical center plane through the clevis 34 and extend substantially normal to that plane. Actuating means are provided to urge the rollers 37 away from one another in the slots 38 and 39 whereby to raise the hook support frame 31 and thus the hook element clamping jaws 17 and 18 with the hangers 11 and 12 clamped therebetween whereby to raise the store 10 to bring its flat surface portion 23 into face to face abutment with the co-operating face 28 formed by the underside of the pylon 25. Suitable actuating means are provided for actuating the linkage 29 to engage and disengage the hook element clamping jaws 17 and 18 with the respective enlarged head portion 14 and to urge the rollers 37 apart from one another to raise the hook support frame 31 to the position shown in FIG. 7B in which the flat surface 23 of the store 10 abuts the underside of the pylon 25. Further, suitable means, such as spring loaded wedges operable to be driven into tapered slots formed between the structure of the pylon 25 and the hook support-frame 31 are provided for vertical adjustment of the clamping assemblies 15 and 16 during loading of the store 10 whereby to eliminate gaps between the abutting surfaces 23 and 28.

Figure 8B:
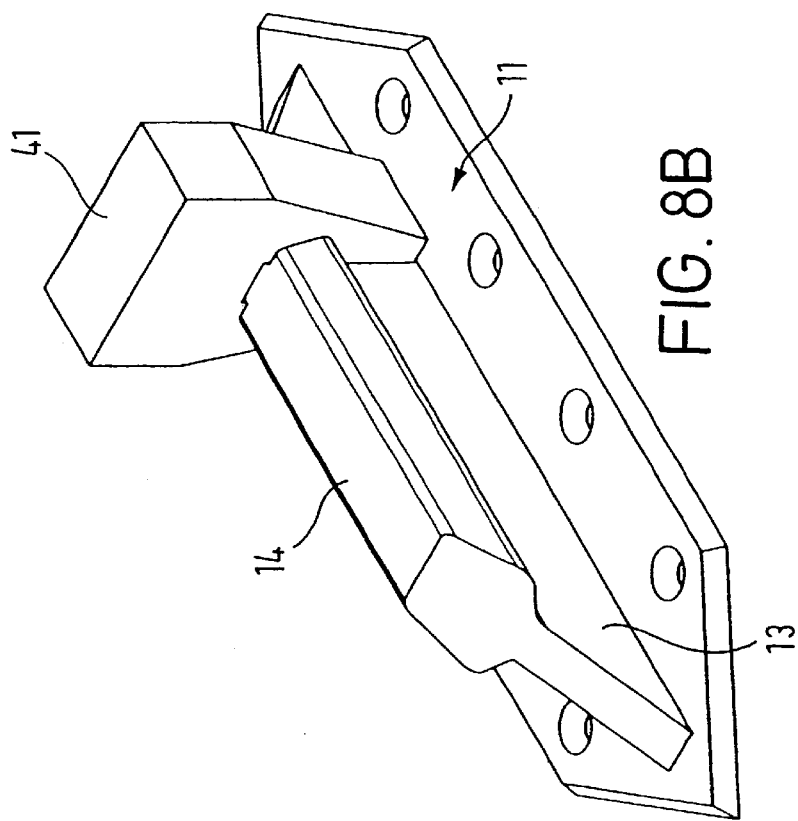
FIG. 8B is a view similar to FIG. 8A showing the fork engaged with the hanger.
Figure 8A:
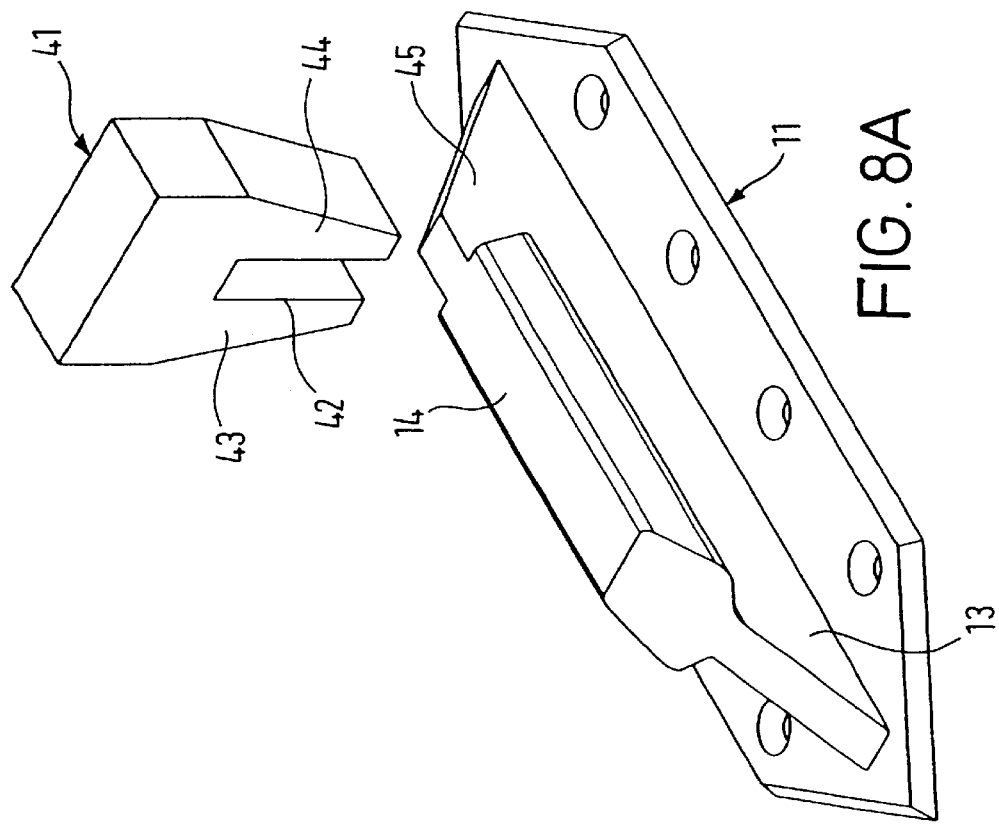
FIG. 8A is a perspective view of a hanger for mounting on a store in carrying out this invention and a locating fork for co-operating with the hanger to react lateral and/or fore and aft forces which act on the hanger when the hanger is in use to suspend a store from aircraft structure, the fork being for mounting on the aircraft structure.

FIG. 8A shows one of the hangers 11 or 12, say the hanger 11, and a fork member 41 which is mounted in the interior of the structure of the pylon 25. A slot shaped aperture 42 between limbs 43 and 44 of the fork member 41, is designed to snugly receive an extension 45 of web structure that forms the strut portion 13 of the hanger 11. The extension 45 is a projection of the hanger 11 beyond an end of the enlarged head portion 14 of that hanger 11 as can be seen in FIG. 8A. The extension 45 is a sliding fit within the aperture 42 so that each of the limbs 43 and 44 of the fork member 41 serves as an abutment which reacts lateral forces applied to the hanger 11 through the store 10. Also by their abutment with the end of the enlarged head portion 14 of the hanger 11, the end faces of those limbs 43 and 44 adjacent the head portion 14 react fore and aft forces applied to the hanger 11 through the store 10.

FIG. 8B shows the fork member 41 fitted over the extension 45 of the hanger 11 and abutting the adjacent end of the enlarged head portion 14 of that hanger 11.

A similar fork member (not shown) is provided to interact in a similar way with the other hanger 12 to react lateral forces and fore and aft forces that are applied to the hanger 12 through the store 10.

Figure 9A:
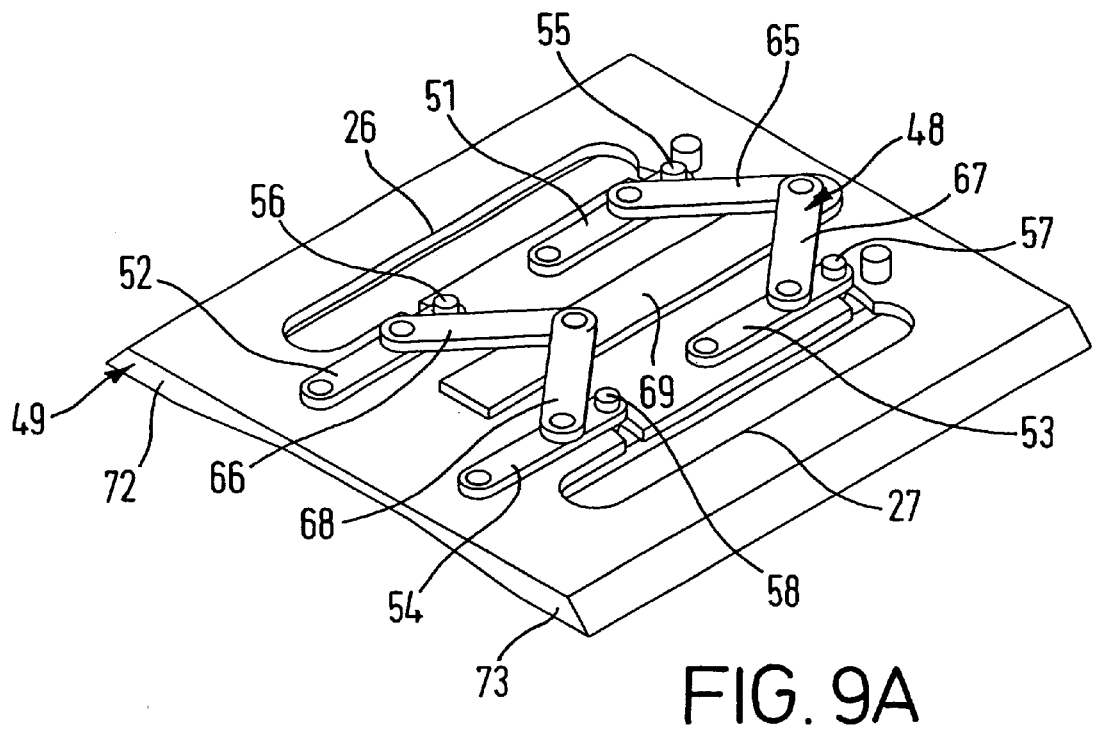
FIG. 9A is a perspective view from above of part of the aircraft structure in which slots are formed through which the hangers extend to be engaged by releasable clamping arrangements as shown in FIGS. 7A and B, and a linkage for displacing covers to cover those slots when no hanger extends through them.
Figure 9B:
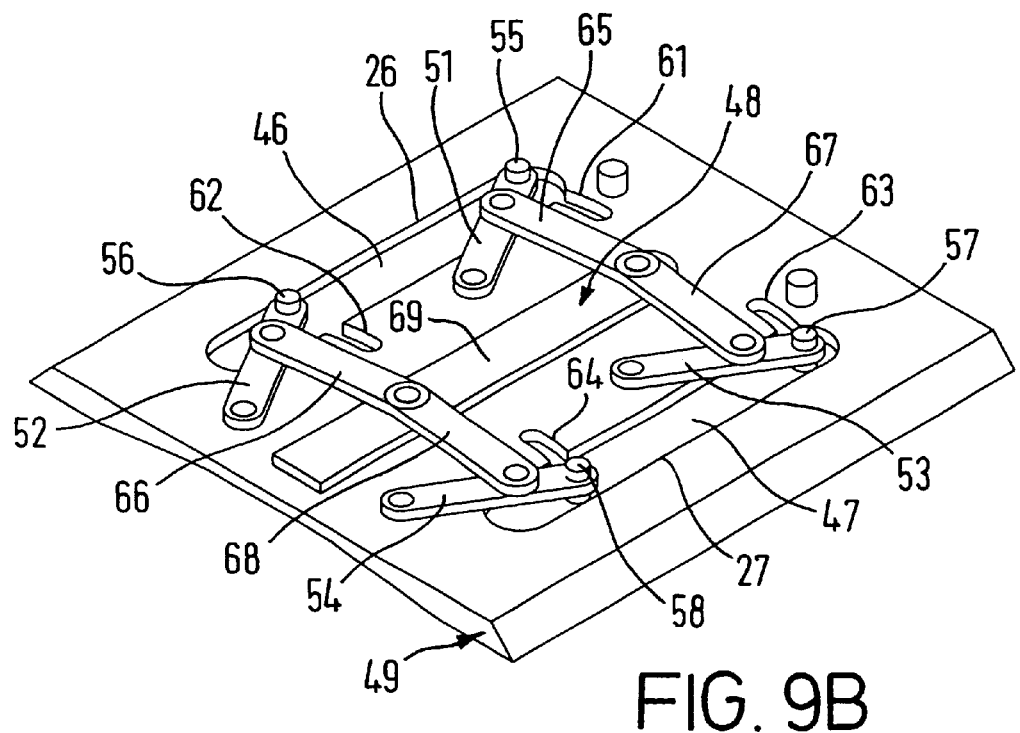
FIG. 9B is similar to FIG. 9A and shows the linkage displaced to position the covers under the slots.
Figure 10A:
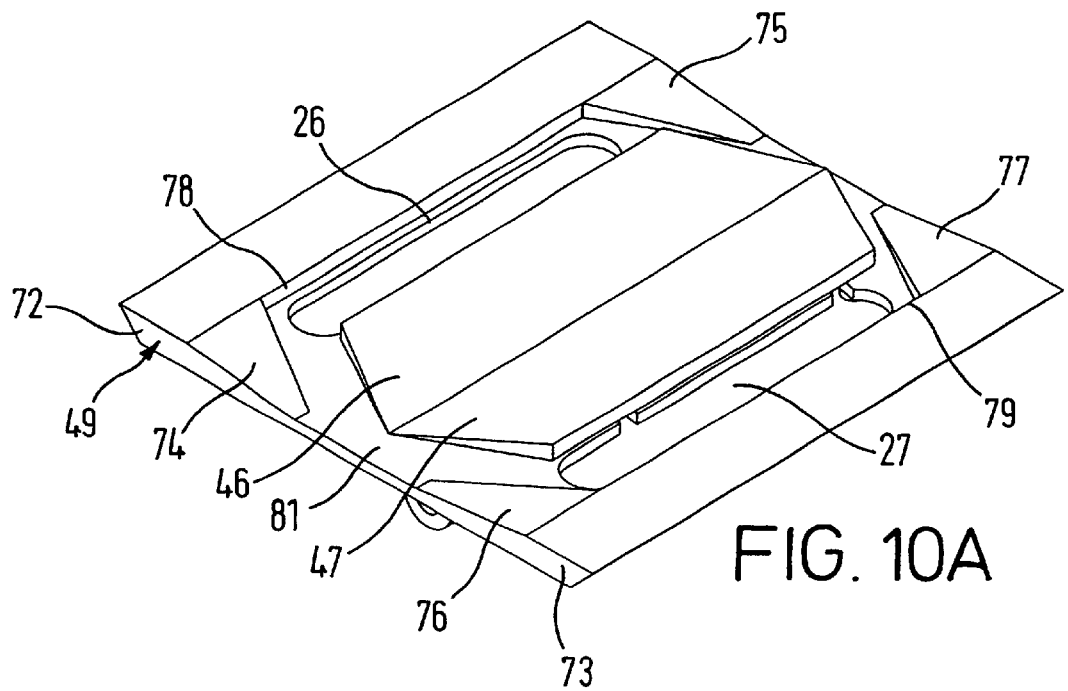
FIG. 10A is an underneath view in perspective of the part of the aircraft structure shown in FIGS. 9A and 9B with each cover displaced to one side of the respective slot.
Figure 10B:
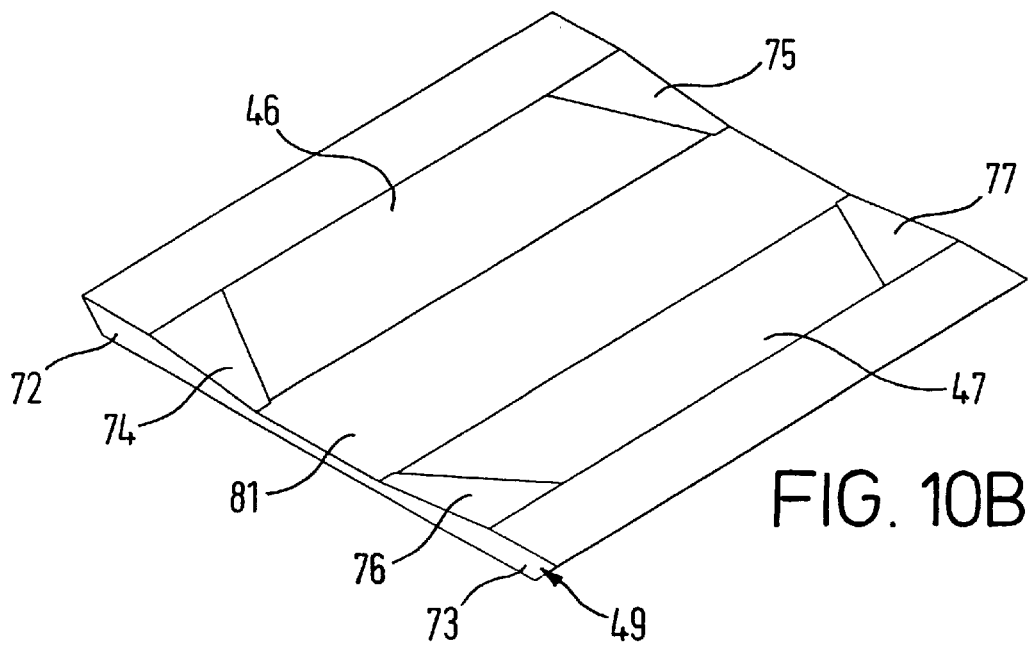
FIG. 10B is a view similar to FIG. 10A showing the covers in position over the slots.

FIGS. 9A, 9B, 10A and 10B illustrate shutters 46 and 47 for covering the slots 26 and 27 and a linkage mechanism 48 which is operable to slide the shutters 46 and 47 sideways from one position shown in FIG. 10A in which the slots 26 and 27 are open to another position shown in FIG. 10B in which each slot 26, 27 is closed by a respective one of the shutters 46 and 47.

The linkage mechanism 48 is mounted on the upper side of structure 49 which forms the base of the pylon 25 as shown in FIGS. 9A and 9B. The linkage mechanism 48 has two pairs of swinging arms 51 and 52, 53 and 54 which are each hinged at one end to the pylon base structure 49. The other end of each swinging arm 51–54 carries a pin 55–58 which projects through a respective arcuate slot 61–64 formed in the base structure 49 of the pylon 25. Each arcuate slot 61–64 opens into a respective one of the slots 26 and 27, the two arcuate slots 61 and 62, 63 and 64 that receive the two pins 55 and 56, 57 and 58 that are carried by the swinging arms 51 and 52, 53 and 54 of each pair opening into a respective common one of the slots 26 and 27. Each pin 55–58 that projects through a respective arcuate slot 61–64 is connected at its lower end to a respective one of the shutters 46 and 47, each shutter 46, 47 being connected to the two pins 55 and 56, 57 and 58 that extend through the two arcuate slots 61 and 62, 63 and 64 that open into the respective slot 26, 27. Each swinging arm 51–54 has a respective lever 65–68 hinged to it at a location between its ends. The pair of levers 65 and 66, 67 and 68 that are connected to the swinging arms 51 and 52, 53 and 54 of each pair are in turn pivotally connected to a central beam 69 which is rectilinearly movable under the actuation of a suitable actuator (not shown). Rectilinear movement of the beam 69 increases or decreases the angle included between the pairs of levers 65 and 66, 67 and 68 hinged to it which in turn causes swinging movement of the pairs of swinging arms 51 and 52, 53 and 54 either towards or away from the respective slot 26, 27.

FIGS. 7A, 7B and 9A to 10B show that the upper side of the pylon base structure 49 is substantially flat and that the underside forms a shallow recess 71 between the two depending portions 72 and 73. Each depending portion 72, 73 forms a substantially flat outer surface portion which is generally rectangular and which extends from the front to the rear of the pylon base structure 49. The two flat rectangular surface portions together form the surface 28 that is abutted by the surface 23 of the store 10. Each depending portion 72, 73 also has two spaced wedge-shaped portions which form spaced sloping surface portions 74 and 75, 76 and 77 which slope inwardly from the respective flat outer surface portion towards the other depending portion 72, 73. The adjacent edges of the sloping surface portions 74 and 75, 76 and 77 of each spaced pair converge towards the respective flat outer surface portions.

Hence each depending portion 72, 73 forms a recess 78, 79 which has the shape of a trapezium in planform as can be seen in FIG. 10A. The base of each recess 78, 79 is flat and has the respective slot 26, 27 formed in it. The opposed recesses 78 and 79 and the spaced wedge-shaped portions of the two depending portions 72 and 73 are spaced apart by a central generally rectangular flat surface portion 81 which extends from the front to the back of the pylon base structure 49 and which is substantially coplanar with the flat base surfaces of the opposed recesses 78 and 79. The shallow recess 71 is formed between the substantially flat outer surface portions of the two depending portions 72 and 73.

FIGS. 10A and 10B show the the shutters 46 and 47 which taper towards one another. Each of the two shutters 46 and 47 is wedge shaped and its shape in plan is that of a trapezium. The taper of each wedge shaped shutter 46, 47 is from the shorter to the larger side of the trapezium. Each shutter 46, 47 is adapted to fit snugly into the respective correspondingly shaped recess 78, 79 when slid into position to cover the respective slot 25, 27. The shutter arrangement is adapted to be actuated after the store 10 has been released from the pylon 25 so that the slots 26 and 27 in the pylon base 49 are thereby covered and blended into the pylon profile so as to reduce drag. The shutters 46 and 47 and the surrounding structure 49 are shaped so that the surfaces of the shutters 46 and 47 and adjacent structure 49 slope with respect to the general plane of the underside of the pylon 25. The arrangement of the shutters 46 and 47 and the surrounding structure 49 such that the shutters 46 and 47 are flush with the surrounding structure when the shutters 46 and 47 are positioned to close the slots 26 and 27 also minimises drag.

The shutters 46 and 47 are arranged to slide laterally so as to require minimal travel to obscure the slots 26 and 27. However, fore and aft movement of such shutters might easily be substituted for lateral movement if the base design of the pylon was thereby facilitated or if its shape was thereby made more convenient.

A typical sequence of events during store attachment and launch of the attached store 10 is as follows:

a) In order to fit the store 10 to a pylon 25 of the aircraft structure, having ascertained that the shutters 46 and 47 and the clamping arrangements 15 and 16 are open, the store 10 is lifted so that each of the hangers 11 and 12 is passed through a respective slot 26, 27 in the base structure 49 of the pylon 25 and the enlarged head portion 14 of each hanger 11, 12 is within the interior of the pylon 25 above the base 49. Guide features of any suitable form may be used to steer the store 10 so as to engage the web extension 45 of each hanger 11, 12 into the respective fork member 41 as shown in FIG. 8B in order to facilitate rapid engagement.

b) When the matching flat face 23 of the store 10 and the underside 28 of the pylon 25 are in contact, or when the hangers 11 and 12 of the store 10 are known to be fully positioned between the hook element clamping jaws 17 and 18 of the respective clamping arrangement 15, 16, the respective clamping arrangements 15 and 16 are closed.

c) A lifting mechanism attached to the hook support frame 31 in a way that allows those sub frames to translate vertically and roll about a main clevis would then be operated and the spring actuated snubbing wedges urged into any small gap increments so generated between purpose designed features on both the hook support frame 31 and the interior structure of the pylon 25.

d) The hook element clamping jaws 17 and 18 of the clamping arrangements 15, 16 would then be equally loaded, albeit it lightly loaded, in which case the store lifting device may be removed. Subsequent loads on the store 10 would then be distributed between the hangers 11 and 12 as uniformly as is reasonably possible.

e) At store release or launch, the clamping arrangements 15 and 16 are operated simultaneously to open the hook element clamping jaws 17 and 18 so that the hangers 11 and 12 emerge from the slots 26 and 27 in the pylon base structure 49 as the store 10 is ejected by suitable store ejection apparatus. At some suitable trigger point, such as when ejector rams of the store ejection apparatus are fully extended, the actuating mechanism for the wedge shaped shutters 46 and 47 is actuated to move the central beam 69 of the linkage mechanism 48 so that the swinging arms 51–54 are displaced angularly with their pins 55–58 displaced through the respective arcuate slots 61–64 into the respective main slot 26, 27 and thereby to slide the wedge shaped shutters 46 and 47 into position to cover the slots 26, 27 and insert the wedge shaped shutters into the correspondingly shaped, recesses 78 and 79 thereby providing the base of the pylon 25 with a smooth and continuous surface profile.

Figure 11A:
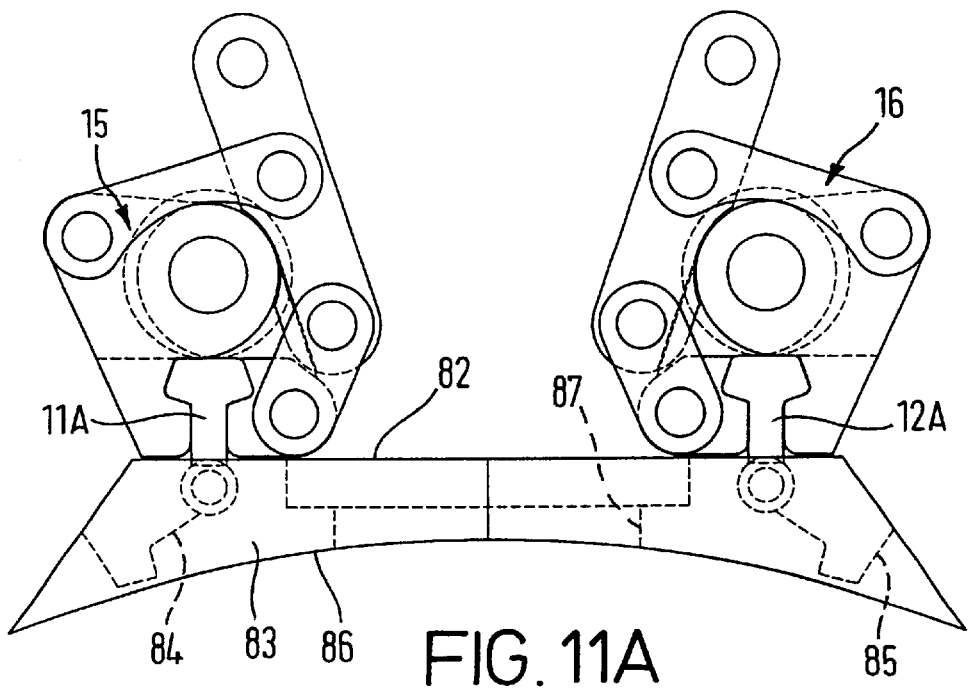
FIG. 11A is an end elevation of an adapter plate for fitting to an arcuate surface of a store and carrying a pivotally mounted hanger for engagement with the releasable clamping arrangement as shown in FIGS. 7A and 7B; the hangers being pivotal between an inoperative position in which they are stored within the adapter plate.
Figure 11B:
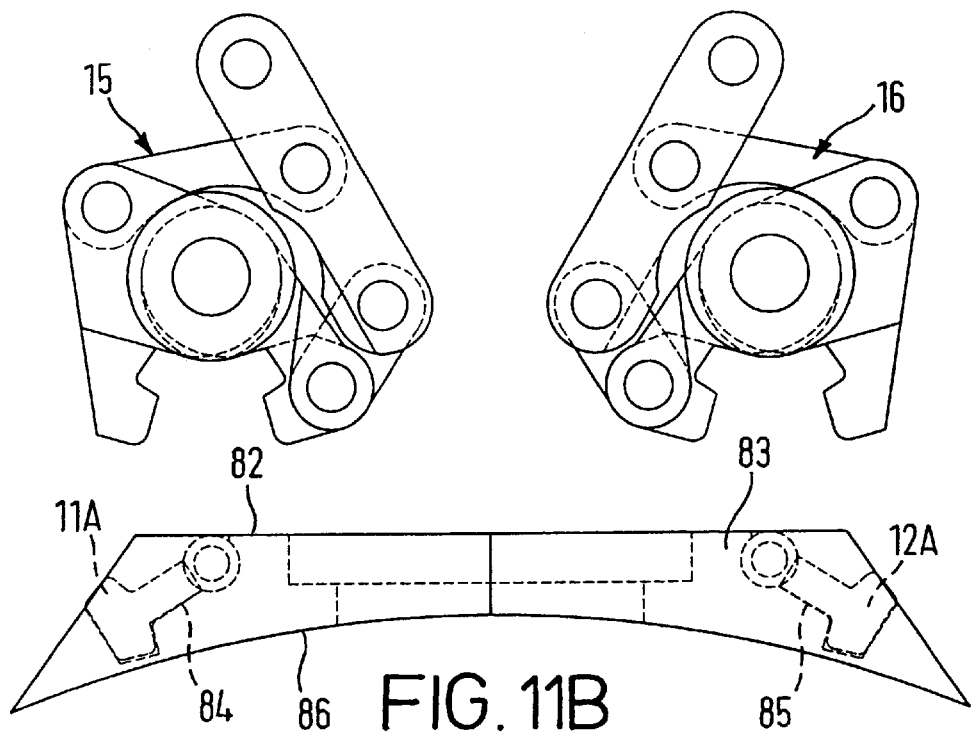
FIG. 11B is a view similar to FIG. 10A showing the releasable clamping arrangements released from the hangers which are stowed in their inoperative positions within the adapter plate.
Figure 12:
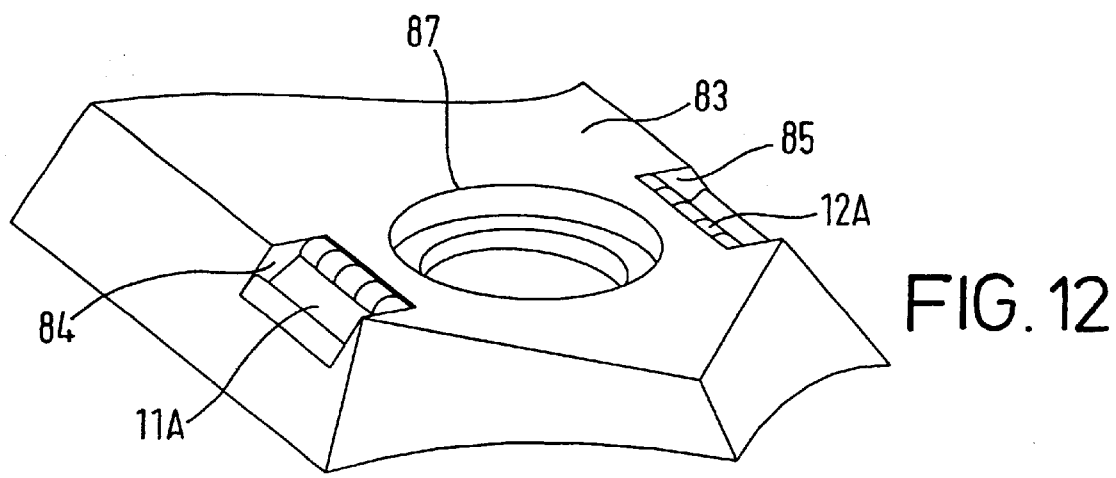
FIG. 12 is a view in perspective of the adapter plate shown in FIG. 11B.

FIGS. 11A, 11B and 12 show one form of adapter plate for attachment to a store having a generally cylindrical body without a flat surface portion for abutment with the underside of a pylon as described above with reference to FIGS. 7A and 7B. FIG. 11A shows hangers 11A and 12A upstanding from a flat surface 82, of the adapter plate 83 and engaged by the respective clamping arrangements 15 and 16. Each hanger 11A, 11B is pivotally mounted in the adapter plate 83 at the edge of a respective recess 84, 85 formed in the adapter plate 83, that recess 84, 85 being sized and shaped to receive the respective hanger 11A, 12A when the respective clamping arrangement 15, 16 is released as shown in FIG. 11B. Each hanger 11A, 12A and its respective recess 84, 85 extends along a respective edge of the flat surface 82 from the front to the rear of the adapter plate 83. The adapter plate 83 has an arcuate surface 86 opposite the flat surface 82, the arcuate surface 86 being arranged to seat upon the arcuate surface of the cylindrical body portion of the store. A stepped through aperture 87 is formed between the flat and arcuate surfaces 82 and 86 of the adapter plate 83 between the two recesses 84 and 85, the smaller diameter portion of the stepped through aperture 87 opening into the arcuate surface 86. The stepped through aperture 87 is designed to be aligned with a suitably sized cavity formed with a threaded wall in the store so that a headed screw threaded member can be inserted through the stepped through aperture 87 and screwed into the screw threaded cavity to secure the adapter plate 83 on the store.

Suitable actuating means are provided and are operable in response to an appropriate trigger signal to retract the hangers 11A and 12A into the respective recesses 84 and 85 as shown in FIG. 11B so that there are minimal drag inducing protuberances at the exposed surface of the adapter plate 83 when the store has been released from the carrier aircraft.

Figure 13A:
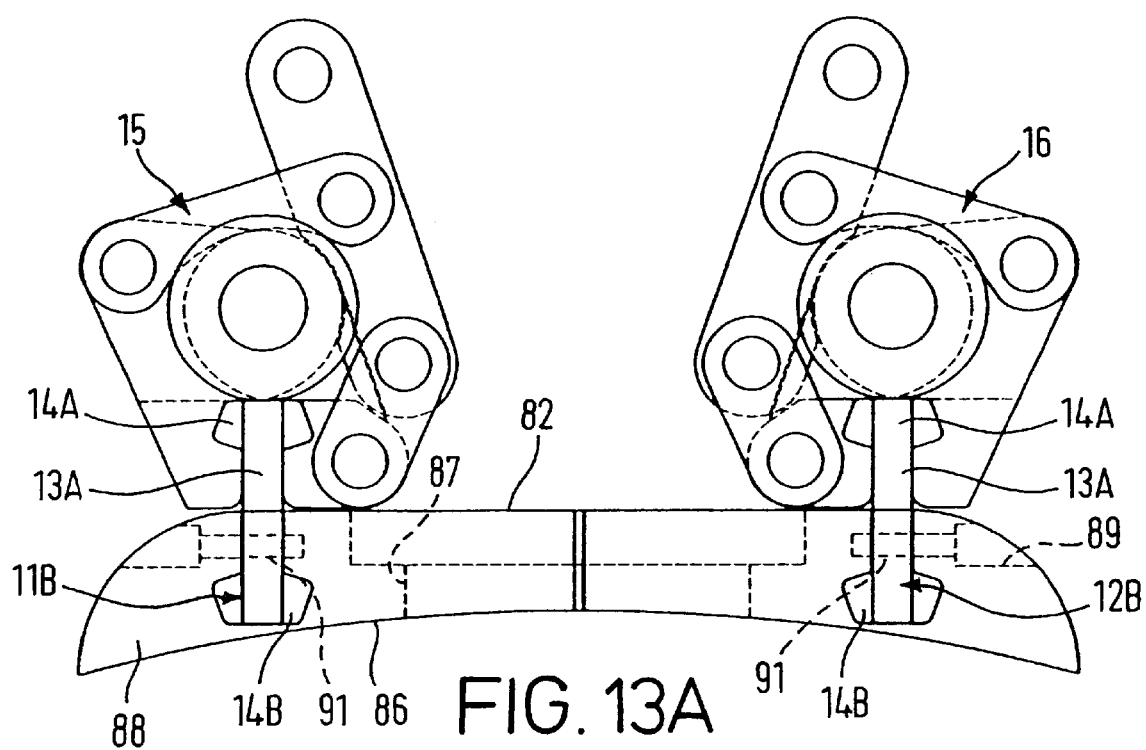
FIG. 13A is an end elevation of an adapter plate for fitting to an arcuate surface of a store and carrying double ended reversible hangers engaged with the releasable clamping arrangements shown in FIGS. 7A and 7B.
Figure 13B:
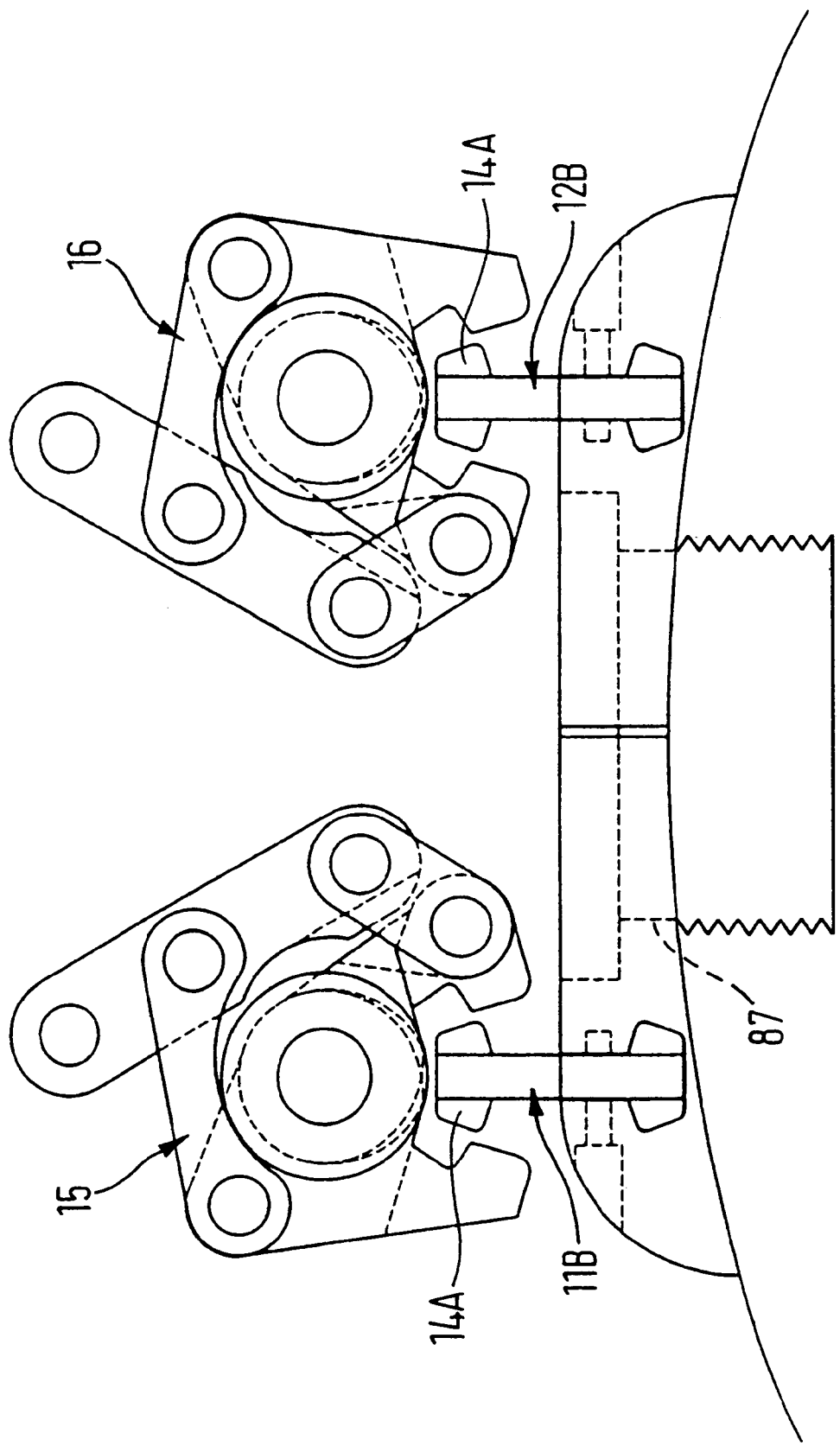
FIG. 13B is a view similar to FIG. 13A showing the releasable clamping arrangements released from the hangers.

FIGS. 13A and 13B show another form of adapter plate which, like the adapter plate 83 shown in FIGS. 11A, 11B and 12 has an arcuate surface 86 opposite a flat surface 82 and a stepped through aperture 87 extending between them. The adapter plate 88 shown in FIGS. 13A and 13B is designed to support two double ended hangers 11B and 12B. Each hanger 11B, 12B has an enlarged head portion 14A, 14B at either end. The adapter plate 88 is arranged so that the enlarged head portion at one end is embedded in the adapter plate 88 as shown in FIGS. 13A and 13B whilst the upper part of the central web portion 13A is upstanding with the other enlarged end portion 14A at its upper end for engagement by the respective clamping arrangement 15, 16. The double ended hangers 11B and 12B are fixed in position within the adapter plate 88 by a respective lateral fixing pin 89 which is inserted through an appropriate aperture 91 in the part of the web portion 13A of the double ended hanger 11B, 12B that is embedded in the adapter plate 88. The arrangement is such that when the clamping arrangements 15 and 16 are released from the upper enlarged head portion 14A as shown in FIG. 13B, the double ended hangers 11B and 12B can be extracted from the adapter plate 88 and turned around so that the end 14B that had previously been embedded within the adapter plate 88 is then used as the upper end to be engaged by the respective clamping arrangement 15, 16.

FIG. 14 shows that a compressible sealing member 92 can be fitted between the flat surface 23 of the store 10 and the underside 28 of the pylon 25 of the aircraft structure at the edge of the flat surface 23 so as to incorporate any movements of the store 10 relative to the pylon 25 that may occur despite the rigidity of the assembly formed by engagement of the hangers 11 and 12 by the clamping arrangements 15 and 16 within the pylon 25.

Figure 15A:
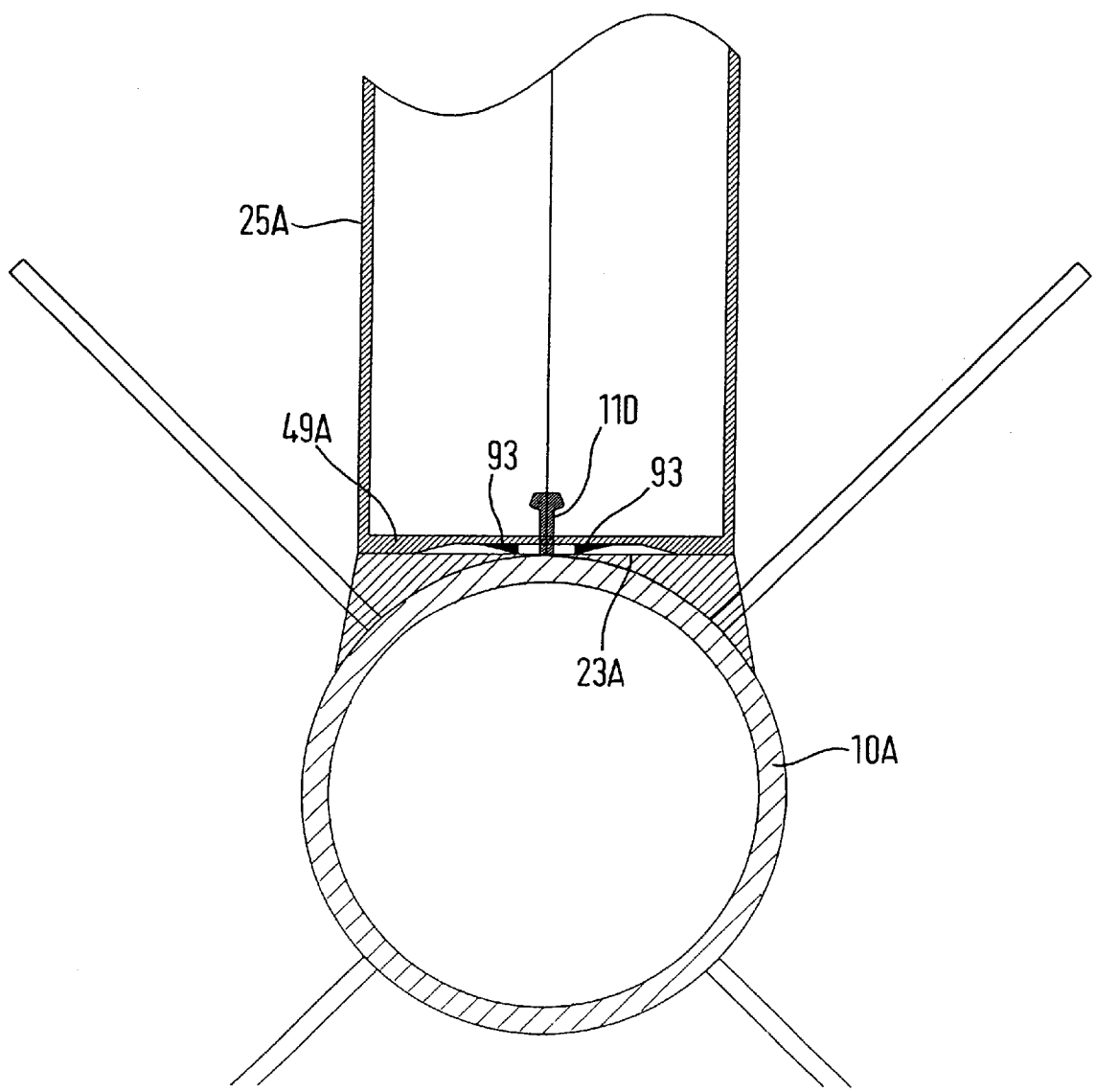
FIG. 15A is a view similar to FIGS. 7A and 7B of another practical embodiment of this invention which incorporates a single centrally mounted hanger in place of each pair of hangers of the embodiments of FIGS. 1 to 10B.
Figure 15B:
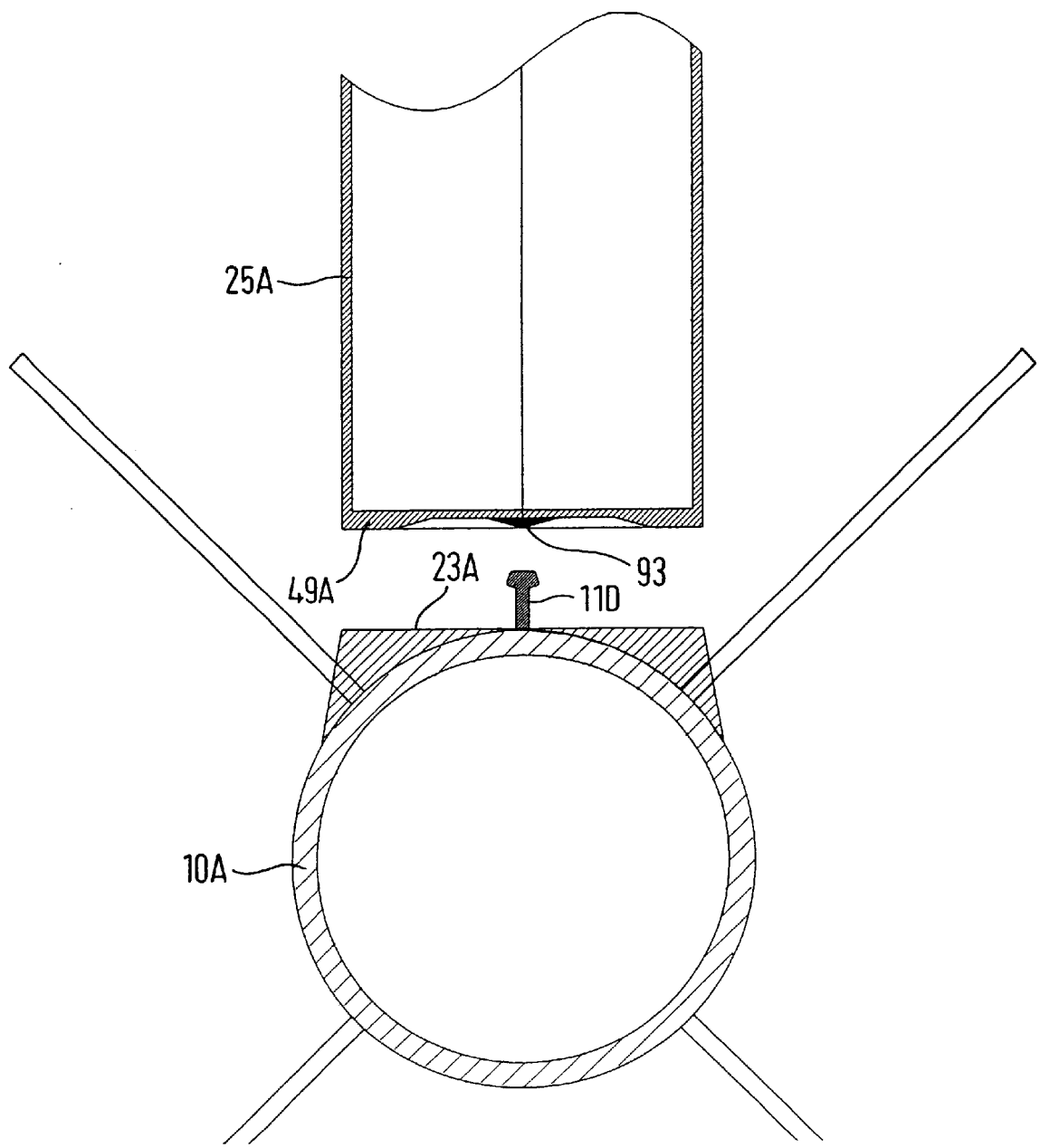
FIG. 15B is a view similar to FIG. 15a showing the store released from the aircraft structure.

FIGS. 15A and 15B show an alternative embodiment of this invention in which a single centrally located hanger 11D is used in place of each of the pair of hangers 11 and 12 described above. In this arrangement, the other part of the moment, reacting couple is provided by a bearing force between the base surface structure 49A of the pylon 25A and the edge of the flat surface 23A of the store 10A that is in face to face abutment with the underside of the pylon 25A. This arrangement has the advantage that store drag is further reduced after release since the number of hangers is halved, and since there are fewer slots in the base of the pylon 25A which need to be covered, but it does require loads to be carried by the pylon base structure 49A particularly at its outer extremity. A shutter arrangement 93 similar to that described above with reference to FIGS. 9A to 10B may be incorporated, preferably with two half plates meeting in the center, for each of a tandem arrangement of hangers 11D.

Store suspension and release arrangements which embody this invention have the following advantages:

a) Gaps between the store and aircraft structure from which it is suspended can be substantially eliminated.

b) The store suspension apparatus, including the hangers and clamping arrangements achieve a high roll stiffness so that gaps do not appear between the mating parts of the aircraft structure and the store during aircraft manoeuvring.

c) The surface of the aircraft structure which mates with a corresponding surface of the store when the store is suspended therefrom can be cleaned up and provided with a smooth and continuous profile after the store has been released.

d) Provision of the store with hangers of this invention results in minimal parasitic drag on the released stores.

e) Use of the hangers enables stores to be compatible with both eject launch systems for free-fall stores and rail launch systems.

This invention enables all these objectives to be met by providing a precision fit between the store and the pylon, an inherently rigid geometry and by minimising apertures in the aircraft structure through which the hangers extend so that they may be more easily concealed after release of the store by compact shutters. The parasitic drag effect is reduced because the suspension features projecting from the store are much more compact and also more easily retracted or folded into the store structure to eliminate drag increments.

It is to be understood that in embodiments comprising more than one hanger, the hangers may be similar, it not being essential that they are identical.

What is claimed is:

1. An airborne store suspension and release arrangement including at least one hanger having a narrow strut portion and an enlarged cross-section portion, the narrow strut portion being adapted to be mounted by one end on a store so as to be upstanding therefrom and the enlarged cross section portion being at another end of the strut portion, the arrangement also including means adapted to be mounted in structure of store carrying aircraft and operable to embrace said hanger by embracing the enlarged cross section thereof whereby to retain the store suspended from the aircraft and means operable to effect release of the store from the embracing means in order to release the store from the aircraft, wherein means separate from said hanger are provided for operation in combination with the hanger to establish a couple in reaction to a rolling moment to which said store is subjected during maneuvering of said store carrying aircraft when said hanger is mounted on said store and said store is suspended from said aircraft structure, the enlarged cross section portion of said hanger being embraced by said releasable embracing means, wherein said aircraft structure is formed with a slot for the at least one hanger, that slot being just wide enough for the passage through of the respective hanger, the embracing means being within the aircraft structure, and wherein shutter means are provided for covering said at least one slot when no hanger extends through the slot.

2. An airborne store suspension and release arrangement according claim 1, wherein said store and said aircraft structure are formed surfaces which abut one another when said store is suspended from said aircraft structure, said means operable in co-operation with said hanger to establish said coupling including said butting surfaces.

3. An airborne store suspension and release arrangement according to claim 2, wherein the upstanding portion of said one hanger is aligned with the geometrical center of said store.

4. An airborne store suspension and release arrangement according to claim 1, wherein there are two said hangers and respective releasable embracing means operable to embrace the enlarged cross section portion of each hanger, the two hangers being located one on either side of a vertical plane through the centre of the store, the vertical plane being substantially midway between the upstanding strut portion of the two hangers.

5. An airborne store suspension and release arrangement according to claim 1, wherein said releasable embracing means are releasable clamping means operable to clamp said enlarged cross section portion of said one hanger.

6. An airborne store suspension and release arrangement according to claim 4, wherein said embracing means are overhead rail means from which said store is adapted to be suspended and on which said enlarged cross section portion of each said hanger is adapted to slide.

7. An airborne store suspension and release arrangement according to claim 1, including abutment means mounted in said aircraft structure and adapted to be engaged with part of the or each said hanger.

8. An airborne store suspension and release arrangement according to claim 7, wherein said abutment means is adapted to react roll forces exerted by a store suspended by said aircraft structure.

9. An airborne store suspension and release arrangement according to claim 7, wherein said abutment means are adapted to react forces exerted by a store suspended by said aircraft structure in a fore and aft direction.

10. An airborne store suspension and release arrangement according to claim 7, wherein said abutment means is a fork member.

11. Apparatus according to claim 1, wherein said at least one hanger is pivotally mounted by said one end at the edge of the correspondingly shaped recess in the structure in which the said at least one hanger is mounted, and means are provided which are operable to pivot said at least one hanger into the respective recess when the hanger is released from the embracing means.

12. Apparatus according to claim 1, wherein the or each said hanger is a reversible member with such an enlarged cross section portion at either end of a medial narrow strut portion, one of the enlarged cross section portions being embedded in the supporting structure so that the remainder of the hanger is upstanding from that structure.

13. An airborne store suspension and release arrangement according to claim 1, wherein the shutter means are flush with the surrounding structure when said at least one slot is closed thereby.

14. An airborne store suspension and release arrangement according to claim 1, wherein the shutter means are shaped so that their front and rear surfaces are oblique to the fore and aft axis of the store and to a lateral axis normal to said fore and aft axis.

15. An airborne store suspension and release arrangement according to claim 1, wherein compressible sealing means are provided between mating surfaces of a store and said aircraft structure when a store is suspended from said aircraft structure.

* * * * *

UNITED STATES PATENT AND TRADEMARK OFFICE
CERTIFICATE OF CORRECTION

PATENT NO.   : 6,634,599 B2                                              Page 1 of 1
DATED        : October 21, 2003
INVENTOR(S)  : Dennis Griffin It is certified that error appears in the above-identified patent and that said Letters Patent is hereby corrected as shown below:

Column 11,
Line 34, "of store" should read -- of a store --.
Line 55, "formed surfaces" should read -- formed with surfaces --.

Signed and Sealed this

Thirtieth Day of December, 2003

JAMES E. ROGAN
*Director of the United States Patent and Trademark Office*